United States Patent Office 3,010,818
Patented Nov. 28, 1961

3,010,818
INCORPORATING TRACE ELEMENTS IN SUPER-
PHOSPHATE FERTILIZERS
Rene A. Jones, Anaconda, Mont., and Lee Van Derlinden, Rendton, Wash., assignors to The Anaconda Company, New York, N.Y., a corporation of Montana
No Drawing. Filed Jan. 30, 1958, Ser. No. 712,076
7 Claims. (Cl. 71—37)

This invention relates to phosphatic fertilizers and, more particularly, to the manufacture of phosphate fertilizers throughout which at least one of the trace elements required for normal plant metabolism is uniformly distributed. The invention provides an improved process for uniformly distributing throughout the superphosphate or equivalent phosphatic fertilizer the very small but critical concentrations of the trace elements which have been found necessary to prevent or alleviate nutritional deficiencies in plants.

The inorganic constituents of a plant have long been recognized as essential participants in the biochemical processes involved in the life cycle of that plant. In the higher plants, the presence of a variety of inorganic ions is required for normal growth and function. Much of the information concerning the requirements of higher plants for inorganic ions has been derived from the study of the diseases of field plants. In several instances, a specific pathological condition occurring in a plant has been definitely ascribed to a deficiency of certain metallic elements in the soil in which the diseased plant was grown.

Of the metallic elements found in plant tissue, many have been shown to be indispensable for normal growth and function. These essential elements are conveniently designated as "bulk" elements when they are present in the plant in relatively high concentrations, or "trace" elements when they are detected in plant tissue in extremely minute or trace quantities. Most of the essential trace elements occur in plants as metallic cations, but several inorganic anions, such as iodide, are also required in trace amounts for normal plant metabolism. Table I lists the more important metallic cations which are found in minute concentrations in plant tissue of one type or another and which are presently believed to constitute the minimum number of trace elements indispensable to normal plant growth.

TABLE I

*Metallic cations found in trace amounts in plant tissue*

| | |
|---|---|
| Copper | Aluminum |
| Manganese | Boron |
| Zinc | Cobalt |
| Iron | Molybdenum |
| Magnesium | Vanadium |

Not all of the trace elements listed in Table I are required by every plant. Only a few of the higher plants, for example, have been definitely shown to require aluminum. The elements molybdenum and vanadium are even thought to be non-nutritive to most plants; but both of these trace elements are essential to the nitrogen-fixing microorganisms of the genus Azotobacter, without which many plants are incapable of metabolically assimilating the inorganic nitrogen compounds in soil. Several of the essential trace elements listed in Table I are growth stimulants to a majority of the higher plants, while others promote growth in only a particular type of plant. The growth of heterotrophic plants, by way of illustration, is markedly stimulated by trace amounts of zinc, but this element is toxic to autotrophic plants; thus, the presence of minute concentrations of zinc, is beneficial to the growth of most non-chlorophyllous plants. To establish whether or not a particular plant requires a specific trace element for normal metabolism, the plant must be grown under carefully controlled conditions both in the presence and in the absence of the trace element. The response of the plant to the presence of one or more of the essential trace elements is dependent upon the species of the plant and varies with different soil environments.

Where a specific trace element has been established as being indispensable to the growth of a particular plant, then as a general rule the soil concentrations at which that element is beneficial to the plant are usually limited. In most instances, a decrease in the soil concentration of the required element below the amount necessary for the plant's normal growth, which decrease occurs either through a chemical reaction of the element with other materials in the soil or through gradual depletion due to uptake by the plant, generally results in the occurrence of severe nutritional deficiencies in the plant and its succeeding generations. On the other hand, when the soil concentration of the required trace element is increased over that normally utilized by the plant, then the amount in excess of that required for normal growth cannot be assimilated by the plant and may even become toxic.

The range in soil concentration at which the trace elements are beneficial to plants generally is so limited that the addition of a mixture of essential trace elements to soil to alleviate a deficiency frequently results in normal plant growth only over that area of the treated soil which has received the proper concentration of trace element, while an immediately adjacent area, which has been treated at the same time but which has received an excessive amount of the trace element, may be totally barren of plant growth. This occurrence is prevalent when the mixture of trace elements is unevenly distributed throughout the soil, one area receiving a concentration which is beneficial to plant growth, while an adjoining area being saturated with an amount which is toxic to the plant. When, however, the required concentration of trace element is uniformly distributed throughout soil which is deficient in that element, then normal plant growth may occur over the entire treated area without danger of toxic amounts (or inadequate amounts) of the trace element accumulating in isolated areas.

Various methods have been employed to apply non-toxic yet growth-promoting concentrations of the essential trace elements to soils which are deficient in such elements. The method which is most commonly used and which offers signal advantages to the farmer is based on treating the soil with a fertilizer to which the particular trace element has been added, since many agronomists have observed that fertilizers containing one or more of the essential trace elements are more readily assimilated and metabolically utilized by plants than fertilizers which lack such trace elements.

Although many specialized fertilizers are commercially available, virtually every type of farming requires the use of phosphatic fertilizers, which are most commonly applied in the form of a superphosphate. The superphosphate fertilizers are solids, usually granulated or pelletized, and are added to the soil in this form. Because the soil concentration of trace element at which plant growth is promoted and not destroyed is measured in parts, or even fractions of a part, per million, the total concentration of trace element which must be added to a superphosphate which is to be used to fertilize the soil necessarily must be of very low magnitude, and generally comprises less than about 1 percent by weight of the superphosphate.

Small concentrations of trace element have been incorporated in superphosphatic fertilizers either by impregnating the solid superphosphate with a solution of the trace element or by adding and mechanically intermixing a small quantity of the trace element together with the much larger bulk of superphosphate. With both methods, however, the trace element is unevenly distributed throughout the superphosphate, since the impregnation of a solid superphosphate with a relatively small volume of a solution containing trace elements concentrates the trace elements on the surface of the superphosphate, while the mere mixing of a very small weight of trace elements with a correspondingly enormous quantity of superphosphate in blending equipment which is commercially practical to use also results in an uneven distribution of the former throughout the latter. When a superphosphate which contains an unevenly distributed concentration of one or more of the essential trace elements is applied to soil, then no matter how low the total concentration of trace elements in the superphosphate, the net result is accumulation in isolated areas of the soil of toxic amounts of the particular trace element. Any isolated area of soil which is thereby saturated with a toxic concentration of the trace element, even though this area of soil contains but two or three times the proper concentration of trace element which is beneficial to plant growth, may be rendered incapable of sustaining plant growth. It is no wonder, therefore, that the use of superphosphate fertilizers, containing one or more of the trace elements distributed through the fertilizer, has been unenthusiastically received by many farmers and agronomists.

The present invention provides an improved process for very uniformly distributing throughout a phosphate fertilizer the very small but critical concentrations of one or more of the essential trace elements necessary to sustain normal plant growth. We have discovered that when a salt of a trace element is substantially completely dissolved in acid and the resulting acidic solution is subsequently reacted with phosphate rock, substantially the entire amount of the trace element originally added to the acid becomes distributed with remarkable uniformity throughout the phosphate fertilizer thereby produced. When a superphosphate fertilizer thus prepared is applied to soil by conventional and available distribution techniques, the required concentration of trace element, which is uniformly distributed throughout the fertilizer, becomes adequately uniformly distributed throughout soil which is deficient in that element, allowing for normal plant growth over the entire fertilized area without danger of toxic, or inadequate amounts of the trace element being deposited in isolated areas.

Based on these discoveries, the invention contemplates the improvement, in the production of phosphate fertilizers, of first dissolving an acid-soluble salt of at least one of the trace elements required for normal plant metabolism in the sulfuric, phosphoric or other acid used to treat phosphate rock, and thereafter reacting the resulting salt-containing acid with phosphate rock to produce the phosphate fertilizer. In such manner, a very small concentration of the trace element may be very uniformly distributed throughout the resultant fertilizer.

The amount of trace element (in the form of an acid-soluble salt) dissolved in the acid prior to producing the superphosphate is dependent, of course, on the total concentration of trace element desired in the end-product. In turn, the total concentration of a particular trace element desired in the superphosphate in most cases will vary from 0.01% to 1% by weight, depending upon how deficient the soil may be in that element and the species of plant to be fertilized. Even such small concentrations of trace elements may be distributed throughout the entire body of the phosphate by the method of the invention.

Any salt or salts of one or more of the essential trace elements which is or are capable of being dissolved in the acid used (generally sulfuric acid or phosphoric acid) may be successfully employed in preparing the acidic solution which is subsequently reacted with the phosphate rock to produce a superphosphate or a triple superphosphate. We have obtained particularly satisfactory results using inorganic sulfates or inorganic phosphates of the metals listed in Table I. These inorganic compounds are adequately soluble in either sulfuric acid or phosphoric acid. When an inorganic sulfate of one of the essential trace elements, such as cobalt sulfate, iron sulfate, copper sulfate, manganese sulfate or zinc sulfate, is dissolved in sulfuric acid and phosphate rock is acidulated with this solution, the phosphorus assay of the resultant fertilizer (measured as $P_2O_5$) is measurably unaffected by the small amount of trace element present.

To illustrate the improvements obtained in the manufacture of superphosphate fertilizers when an acid-soluble salt of one or more of the essential trace elements is dissolved in the acid prior to the acidulation of phosphate rock in accordance with the invention, an example of a preferred embodiment of the process of the invention is described below:

Dilute sulfuric acid (assaying about 35% $H_2SO_4$) was prepared for use in treating phosphate rock by dissolving therein approximately 2 pounds of zinc sulfate per ton of acid, 2 pounds of iron sulfate per ton of acid, 2 pounds of copper sulfate per ton of acid, and 2 pounds of manganese sulfate per ton of acid. The resulting prepared sulfuric acid was reacted with Idaho phosphate rock to form a dilute solution of phosphoric acid and an insoluble residue containing calcium sulfate. The phosphoric acid solution, after separation from the insoluble residue, was concentrated by evaporation to an assay of about 65% $H_3PO_4$. The resulting concentrated phosphoric acid contained substantially all of the zinc, iron, copper and manganese that had been dissolved originally in the sulfuric acid.

The phosphoric acid containing the above trace elements was reacted with a further quantity of phosphate rock, in about equal proportions by weight, in a lead lined mixing vessel; and the resulting rather syrupy mixture was run out on to a slowly advancing belt conveyor, on which it rather rapidly set to solid form. As the belt advanced over its end sheave, the solidified product (triple superphosphate) broke up and was discharged on to another conveyor by which it was transported to aging sheds. After aging sufficiently to insure completion of the reaction between the rock and the acid, and after drying, the product was bagged for use as a fertilizer.

The triple superphosphate fertilizer thus produced contained substantially the entire amount of the four trace elements (zinc, copper, iron and manganese) originally added to the sulfuric acid; and these trace elements, present in a concentration of about 0.1% each in the triple superphosphate, were distributed with great uniformity throughout its entire mass. Each particle of the fertilizer product contained essentially the same concentration of these trace elements.

Instead of dissolving sulfates of the trace elements in the sulfuric acid used for preparing the phosphoric acid which in turn is used to make triple superphosphate fertilizer, as described in the above example, compounds of such elements may be dissolved in the phosphoric acid after the latter has been prepared by conventional procedures. In such case, phosphates of the trace elements most advantageously are dissolved in the phosphoric acid, though other salts of such elements, or in some cases the elements themselves, may instead be dissolved therein.

The method of the invention is equally applicable to the manufacture of conventional den superphosphate, which is made simply by reacting a relatively concentrated sulfuric acid with phosphoric acid and allowing the resulting product to set to a solid mass and then age to insure completion of the acid-rock reaction. In such event, as in the preceding example, the desired trace elements, preferably in the form of sulfates, are dissolved in the acid prior to reacting it with the rock.

While the new method has been particularly described with respect to its application to the manufacture of superphosphate fertilizers, it is evident that it can be applied equally well to the manufacture of other phosphatic fertilizers, such as nitrogen-bearing phosphate fertilizers. Such fertilizers may be made by dissolving a nitrogenous substance such as ammonia, ammonium sulfate, or urea in the acid which thereafter is reacted with phosphate rock to produce the phosphate fertilizer. In the manufacture of triple superphosphate, the ammonia or other nitrogen-containing compound may be dissolved in the phosphoric acid (either after it has been prepared, or by dissolving it in the sulfuric acid used to produce the phosphoric acid) prior to reacting the phosphoric acid with phosphate rock. In any of these procedures, the trace element salts may if desired be dissolved in the acid at the same time the ammonia-bearing compound is dissolved therein. In fact, when the nitrogenous substance is supplied in aqueous solution, a convenient way of incorporating such salts is to add to the acid an ammoniacal or other nitrogenous solution in which they are contained, thus incorporating both the nitrogen and the trace element salts in the acid at the same time.

Ammonium phosphate is readily made, for example, by reacting ammonia (anhydrous or aqueous) with concentrated liquid phosphoric acid, and the method of the invention may be applied to the manufacture of this product by first dissolving one or more salts of the trace elements in the phosphoric acid (or in sulfuric acid used to produce the phosphoric acid by reaction with phosphate rock). The solid ammonium phosphate resulting from the acid thus treated, like the superphosphate prepared in accordance with the above example, contains the trace elements originally dissolved in the acid very uniformly distributed throughout the mass of the crystallized phosphate.

We claim:

1. In a process for the manufacture of a phosphatic fertilizer in which phosphate rock is treated with an inorganic acid to produce a phosphatic fertilizer, the improvement which comprises substantially completely dissolving an acid-soluble salt selected from the group consisting of sulfates and phosphates of at least one of the trace elements required for normal plant metabolism in the acid prior to producing the phosphatic fertilizer, said trace element being selected from the group consisting of copper, manganese, zinc, iron, magnesium, aluminum, boron, cobalt, molybdenum, and vanadium, and thereafter reacting the resulting salt-containing acid with phosphate rock to produce a phosphatic fertilizer material, whereby a small concentration of said trace element is uniformly distributed throughout the said fertilizer material, the amount of the acid-soluble salt dissolved in said acid prior to forming the fertilizer being sufficient to obtain a concentration of said trace element in the fertilizer of at least 0.01 percent by weight.

2. A process for the production of a triple superphosphate fertilizer which comprises substantially completely dissolving in an aqueous solution of sulfuric acid an acid-soluble sulfate of at least one of the metallic cations required in trace amounts for normal plant metabolism, said metallic cation being selected from the group consisting of copper, manganese, zinc, iron, magnesium, aluminum, boron, cobalt, molybdenum, and vanadium, reacting the sulfuric acid containing said dissolved metal sulfate with phosphate rock to produce phosphoric acid, and reacting the resulting phosphoric acid with additional phosphate rock, whereby a superphosphate containing a small concentration of said trace element uniformly distributed throughout is produced, the amount of the acid-soluble sulfate dissolved in said acid prior to forming the fertilizer being sufficient to obtain a concentration of said metallic cations in the fertilizer of at least 0.01 percent by weight.

3. A process for the production of a triple superphosphate fertilizer which comprises substantially completely dissolving in an aqueous solution of phosphoric acid an acid-soluble inorganic sulfate of at least one of the metallic cations required in trace amounts for normal plant metabolism, said metallic cations being selected from the group consisting of copper, manganese, zinc, iron, magnesium, aluminum, boron, cobalt, molybdenum, and vanadium, and reacting the phosphoric acid containing said dissolved metal sulfate with phosphate rock to form a triple superphosphate containing a small concentration of said trace element uniformly distributed throughout, the amount of the acid-soluble sulfate dissolved in said acid prior to forming the fertilizer being sufficient to obtain a concentration of said metallic cations in the fertilizer of at least 0.01 percent by weight.

4. In a process for the manufacture of a nitrogen-bearing phosphate fertilizer in which phosphate rock is treated with an inorganic acid containing a nitrogenous compound to produce a nitrogen-containing phosphate fertilizer, the improvement which comprises substantially completely dissolving an acid-soluble salt selected from the group consisting of sulfates and phosphates of at least one of the trace elements required for normal plant metabolism in the acid prior to producing the phosphate fertilizer, said trace element being selected from the group consisting of copper, manganese, zinc, iron, magnesium, aluminum, boron, cobalt, molybdenum, and vanadium, and thereafter reacting the resulting salt-containing acid with phosphate rock to produce a phosphatic fertilizer material, whereby a small concentration of said trace element is uniformly distributed throughout the said fertilizer material, the amount of the acid-soluble salt dissolved in said acid prior to forming the fertilizer being sufficient to obtain a concentration of said trace element in the fertilizer of at least 0.01 percent by weight.

5. A process for the production of nitrogen-bearing triple superphosphate fertilizer which comprises substantially completely dissolving in a solution of phosphoric acid both ammonia and an acid-soluble salt selected from the group consisting of sulfates and phosphates of at least one of the metallic cations required in trace amounts for normal plant metabolism, said metallic cation being selected from the group consisting of copper, manganese, zinc, iron, magnesium, aluminum, boron, cobalt molybdenum, and vanadium, and reacting the resulting phosphoric acid solution with phosphate rock to form a triple superphosphate containing ammonia and a small concentration of said trace element uniformly distributed throughout, the amount of the acid-soluble salt dissolved in said acid prior to forming the fertilizer being sufficient to obtain a concentration of said metallic cation in the fertilizer of at least 0.01 percent by weight.

6. In a process for the manufacture of a solid phosphatic fertilizer, the improvement which comprises substantially completely dissolving in liquid phosphoric acid an acid-soluble salt selected from the group consisting of sulfates and phosphates of at least one of the trace elements required for normal plant metabolism, said trace element being selected from the group consisting of copper, manganese, zinc, iron, magnesium, aluminum, boron, cobalt, molybdenum, and vanadium, and thereafter treating the resulting salt-containing phosphoric acid solution to form therefrom a solid phosphate fertilizer throughout which a small concentration of said trace element is uniformly distributed, the amount of the acid-soluble salt dissolved in said acid prior to forming the fertilizer being sufficient to obtain a concentration of said trace element in the fertilizer of at least 0.01 percent by weight.

7. In a process for the manufacture of a solid phosphate fertilizer in which phosphoric acid is ammoniated to produce ammonium phosphate, the improvement which comprises substantially completely dissolving in liquid phosphoric acid an acid-soluble salt selected from the group consisting of sulfates and phosphates of at least one of the trace elements required for normal plant metabolism, said trace element being selected from the group consisting of copper, manganese, zinc, iron, magnesium, aluminum, boron, cobalt, molybdenum, and vanadium, and thereafter treating the resulting salt-containing acid with ammonia to form therefrom a solid phosphate fertilizer comprising ammonium phosphate and throughout which a small concentration of said trace element is uniformly distributed, the amount of the acid-soluble salt dissolved in said acid prior to forming the fertilizer being sufficient to obtain a concentration of said trace element in the fertilizer of at least 0.01 percent by weight.

References Cited in the file of this patent

UNITED STATES PATENTS

| | | |
|---|---|---|
| 2,739,038 | Heinerth | Mar. 20, 1956 |
| 2,739,054 | Andres et al. | Mar. 20, 1956 |
| 2,783,139 | Datin | Feb. 26, 1957 |
| 2,786,746 | Goldhaar | Mar. 26, 1957 |
| 2,844,455 | Harris | July 22, 1958 |